United States Patent [19]
Wakabayashi et al.

[11] 3,848,218
[45] Nov. 12, 1974

[54] HUMIDITY SENSING ELEMENT

[76] Inventors: Takashi Wakabayashi, C-301, 8, Misawa-cho, Ibaragi; Kanji Sugihara, 17-1 8-chome, Korigaoka, Hirakata, both of Japan

[22] Filed: Sept. 7, 1973

[21] Appl. No.: 394,999

[30] Foreign Application Priority Data
Sept. 20, 1972   Japan.............................. 47-94738

[52] U.S. Cl.................................. 338/35, 338/225
[51] Int. Cl............................................. H01c 13/00
[58] Field of Search................ 338/34, 35, 223–225; 200/61.04; 340/235; 73/336.5

[56]   References Cited
UNITED STATES PATENTS
3,045,198   7/1962   Dolan et al. ...................... 338/35 X
3,671,913   6/1972   Mamiya .............................. 338/35
3,705,375   12/1972  Herbshler ...................... 340/235 X
3,715,702   2/1973   Nicholas ........................... 340/235

*Primary Examiner*—C. L. Albritton
*Attorney, Agent, or Firm*—Wenderoth, Lind & Ponack

[57]   ABSTRACT

A humidity sensing element has a humidity sensitive film which has finely divided conductive particles dispersed in a resin consisting essentially of a reaction product of a chlorine containing polymer and a polyamide resin. Two electrodes are applied to the humidity sensitive film. The electrical resistance of the humidity sensing element increases as the humidity of the atmosphere in which humidity sensing is placed increases. The humidity sensing element has high stability at high humidity, high sensitivity over a given humidity range and can be operated with DC in a high humidity range.

9 Claims, 4 Drawing Figures

3,848,218

HUMIDITY SENSING ELEMENT

This invention relates to a humidity sensing element comprising a humidity sensitive film having two electrodes applied thereto.

There are known in the prior art to the present invention, electrical humidity sensing elements such as a lithium chloride sensing element, a polyelectrolite sensing element, a ceramic sensing element, an aluminum sensing element and a carbon type sensing element. However, these conventional sensing elements do not have sufficiently high stability at high humidity and cannot be stably operated with DC at high humidity.

Accordingly, it is an object of this invention to provide a humidity sensing element having sufficiently high stability, high sensitivity in a given humidity range and which can be operated with DC even at high humidity.

This object is achieved by providing a humidity sensing element comprising a humidity sensitive film which has finely divided conductive particles dispersed in a resin consisting essentially of a reaction product of a chlorine containing polymer and a polyamide resin, and two electrodes applied to said humidity sensitive film. The electrical resistance of the humidity sensing element increases as the humidity of the atmosphere in which the humidity sensing element is placed increases.

This and other objects of this invention will be apparent upon consideration of the following detailed description taken together with the accompanying drawings, wherein.

Figure 1:
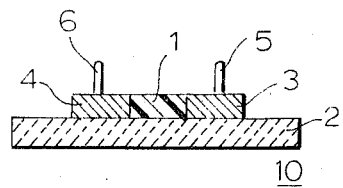
FIG. 1 is a schematic cross-sectional view of one embodiment of a humidity sensing element of this invention.
Figure 3:
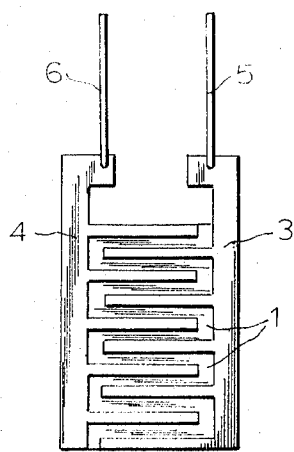
FIG. 3 is a top plan view of a humidity sensing element having electrodes of comb shape as one example of electrodes.

Referring to FIG. 1, reference numeral 10 designates, as a whole, one example of a humidity sensing element of this invention. Reference numeral 1 designates a humidity sensitive film interposed between two electrodes 3 and 4. They are provided on a substrate 2. Two leads 5 and 6 are connected to the electrodes 3 and 4, respectively. The substrate 2 can be made of any available and suitable materials. For example, glass, ceramics and plastics can be used therefor. The electrodes 3 and 4 can be made of any available and suitable materials. For example, graphite paint and metal glaze paste can be used therefor. The distance between the two electrodes 3 and 4 can be chosen optionally. If the total resistance of the humidity sensing element is required to be lower, the distance between the electrodes 3 and 4 is made shorter. The shape of the electrodes 3 and 4 can be designed optionally. Electrodes of a comb shape as shown in FIG. 3 are preferable for obtaining a very low resistance of the humidity sensitive film 1 in a very limited space, because the effective width of each electrode is very large.

The thickness of the humidity sensitive film 1 can be chosen optionally. As the thickness of the humidity sensitive film increases, the humidity sensitive film 1 has lower electrical resistance, but slower response to the change of humidity. Broadly speaking, if the thickness is reduced by a half the response time (defined later) also is reduced by a half. It follows that the electrical resistance then becomes double. It is preferred that the thickness of the humidity sensitive film 1 is designed to be between 2 and 5 microns, but it can be thicker or thinner than that. It is further preferable that the humidity sensitive film be very uniform.

The resistance of the humidity sensitive film also depends on the electrical contact resistance of the finely divided conductive particles dispersed therein. The dependence of resistance of the humidity sensitive film on the finely divided conductive particles may be attributable to the following mechanism. As the relative humidity increases, more water may be absorbed by the resin so as to swell the resin. This swelling of the resin causes the average particle distance to increase, resulting in an increase of resistance. As relative humidity decreases, water is given off from the resin, and the resin contracts, resulting in a decreased of average particle distance and an increase of the number of electrical contacts among conductive particles, so that the resistance of the humidity sensitive film, is decreased.

In preparing a humidity sensitive film 1, a chlorine containing polymer is mixed and reacted with a polyamide resin. It is preferred from the view point of the stability and the sensitivity to relative humidity of the resultant humidity sensitive film that the reactive proportions of the chlorine containing polymer and the polyamide resin be 70 to 10 weight % of chlorine containing polymer and 30 to 90 weight % of polyamide resin. That is, if a mixture of a chlorine containing polymer and a polyamide resin includes more than about 90 weight % of polyamide resin, the resultant humidity sensitive film has unstable mechanical characteristics in a high humidity environment. If the mixture includes less than about 30 weight % of polyamide resin, the resultant humidity sensitive film, has low sensitivity.

Preferable materials for the chlorine containing polymer are: (1) chlorinated diene polymer or diene-monoene polymer such as chlorinated natural rubber; (2) chlorine containing vinyl polymer such as polyvinyl chloride and polyvinylidene chloride; and (3) chloro-substituted polyolefine such as chlorinated polyethlene and polypropylene. Among them, chlorinated natural rubber is most preferable. In the case of the chlorinated natural rubber, a chlorinated natural rubber having 68 weight % of chlorine incorporated therein is best. (It is known that 68 weight % of chlorine is the maximum amount of chlorine addable stably to natural rubber.) There is also a stable chlorinated natural rubber containing 34 weight % of chlorine, but if this chlorinated natural rubber is used, the amount thereof should be more than in the case of chlorinated natural rubber containing 68 weight % of chlorine.

Preferable materials for the polyamide resin are those produced by the condensation of a carboxylic acid with an alkylene polyamine such as ethylene diamine, diethylene triamine and triethylene tetramine. The carboxylic acids include saturated or unsaturated fatty acids and polycarboxylic acids obtained by the thermal polymerization of unsaturated fatty acids. According to this application, the product obtained by the condensation of carboxylic acids with an alkylene polyamine is defined as a "condensation product of a carboxylic acid and an alkylene polyamine". The amount of active primary amino group in the polyamide resin has a great effect on the reactivity of the polyamide resin with a chlorine containing polymer and also on the sensitivity of the resultant humidity film. That is, a polyamide resin having a higher content of active primary amino group can more easily react with a chlorine containing polymer and contributes to the production of a humidity sensitive film having high sensitivity. It is preferred that the amine value which represents the content of the active primary amino group be larger than 100.

The humidity sensitive film has finely divided conductive particles uniformly dispersed in resin. The finely divided conductive particles preferably have an avarage particle size of less than about 0.5 micron. When the average particle size is more than 0.5 micron, the resultant humidity sensitive film has unstable electrical resistance.

A preferred material for the finely divided conductive particles is one more selected from the group consisting of carbon black, graphite, silver and gold. Among those materials, carbon black and graphite give better results.

The resistance and humidity sensitivity of the humidity sensitive film and the humidity range in which the humidity sensitive film has high sensitivity can be controlled by changing the kind of finely divided conductive particles dispersed therein and the proportion of finely divided conductive particles included in the resin. As the average particle size of the conductive particles gets larger, the humidity range in which the resultant humidity sensitive film has sensitivity shifts in the direction of lower humidity. This can be more easily understood with reference to FIG. 4. That is, in a humidity sensitive film including conductive particles having a certain average particle size and having a characteristic curve 2, as the average particle size gets larger, the characteristic curve is changed from the curve 2 to e.g. the curve 1. The humidity range in which the resultant humidity sensitive film has high sensitivity depends not only on the average particle size of the conductive particles as set forth above but also on the kind of materials used for the conductive particles. For example, in the case when the conductive particles are of graphite having a certain average particle size, the humidity range in which the resultant humidity sensitive film has high sensitivity is higher than that in the case when the conductive particles are of carbon black having the same average particle size. Furthermore, as the proportion of the conductive particles to the resin increases, the resistance of the resultant humidity sensitive film decreases, and the humidity range in which the resultant humidity sensitive film has high sensitivity shifts in the direction of higher humidity.

The mixture of a chlorine containing polymer and a polyamine resin is dissolved in a solution. Any available and suitable solvent which dissolves both the chlorine containing polymer and the polyamide resin can be used therefor. For example, toluene and ortho-dichlorobenzene can be used therefor. If required, the solution is adjusted to have a proper viscosity. Finely divided conductive particles in the desired amount are added to the solution. The mixture is mixed well by any suitable method, such as a supersonic wave dispersion technique, to produce a homogeneous paint having finely divided conductive particles dispersed uniformly in the solution. The paint can further include a filler, antioxidant agent, an ultraviolet absorbant and or a plasticizer for increasing the stability of the resultant humidity sensitive film. The paint is applied to the surface of a suitable substrate by a suitable method. For example, well known methods of squeezing, dipping and printing can be used therefor.

Electrodes can be applied later than the step of applying the paint, but it is easier for manufacturing a humidity sensing element to apply electrodes to the substrate before the paint is applied to a substrate.

Then, the substrate having thereon the paint having finely divided conductive particles dispersed in resin is heated at a suitable heating temperature for a suitable heating time. The heating time depends on the heating temperature. The heating temperature and heating time are preferably chosen to make the chlorine containing polymer react with the polyamide resin suitably. At a heating temperature of 130°C, for example, the heating time is preferably less than about 5 hours and more than 10 minutes, most preferably about 60 minutes. At a heating temperature of 160°C, for example, the heating time is preferably less than about 3 hours and more than 5 minutes, most preferably about 30 minutes.

By the heating treatment, an insoluble uniform humidity sensitive film can be formed on the substrate due to the reaction of a chlorine containing polymer and a polyamide resin. The humidity sensitive film has ionic conduction depending on the chlorine ions produced from the chlorine containing polymer by the reaction of a chlorine containing polymer and a polyamide resin in addition to the conduction depending on the contacts of finely divided conductive particles dispersed therein. The ionic conduction has a bad effect of DC operation of the humidity sensing element. Accordingly, it is preferred that the chlorine ion be removed from the humidity sensitive film. One example of the removing operation is as follows. The substrate with the humidity sensitive thereon is soaked in an alkali solution of suitable concentration for a suitable time. For example, when a 0.1 normal aqueous solution of sodium hydroxide is used, a suitable soaking time is 30 minutes to 1 hour at room temperature. Then, the substrate with the humidity sensitive film thereon is sufficiently washed with distilled water for removing the alkali. This step is called the alkali removing treatment.

According to this application, the final produce obtained by the reaction of a chlorine containing polymer and a polyamide resin is defined as a "reaction product of a chlorine containing polymer and a polyamide resin". This is because the final product has a very complicated structure and cannot be clearly analyzed, so that it cannot be defined otherwise. Further, that definition does not result in unclearness. The reaction product of a chlorine containing polymer and a polymide resin treated with the alkali removing treatment is also included in the expression reaction products of a chlorine containing polymer and a polyamide resin according to this application.

Figure 4:
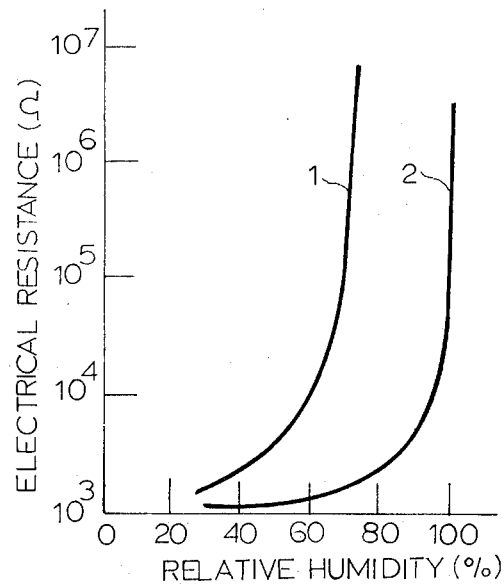
FIG. 4 is a graph illustrating two curves of electrical resistance VS. relative humidity of two humidity sensing elements.

The electrical resistance of the resulting humidity sensing element, after the alkali removing treatment, increases super logarithmically as the humidity increases and the humidity sensing element has a unique curve of electrical resistance VS. relative humidity (RH) as shown in FIG. 4. The curve of electrical resistance VS. RH of a humidity sensing element is obtained by a humidity test as follows. The humidity sensing element is placed under an atmosphere having a temperature of 20°C and a certain humidity. During the initial time period, the resistance of the humidity sensing element continuously changes as time passes. However, after a certain length of time, the resistance does not change any more. This final resistance is plotted on a resistance VS. RH characteristics graph. Likewise, final resistance of the humidity sensing element at many other humidities (20°C) are plotted on the graph. By connecting the plots, the curves such as those of FIG. 4 are obtained.

The humidity sensing element produced by this invention has high stability, high sensitivity in a given humidity range and rapid response to the change of humidity which is represented by a "response time". The work "response time" used in this application is defined as follows. First, the curve of resistance VS. RH (at 20°C) is made. From the curve, the resistances at 55% RH and [55 + (75 − 55) 33 0.95]= 74% RH are obtained. Then the humidity sensing element is placed in an atmosphere of 55% RH (20 °C) for a sufficient time to have an electrical resistance corresponding to the curve of the resistance VS. RH at 55% RH. Thereafter, the humidity sensing element is instantaneously moved to an atmosphere having 75% RH (20°C). The resistance of the humidity sensing element starts increasing and reaches to the value corresponding to 74% RH on the curve of resistance VS. RH. The time required for the humidity sensing element (20° C) to reach the resistance value corresponding to the 74% RH from the time when the humidity sensing element is instantaneously moved to the atmosphere of 75% RH is defined in this application as the response time of the humidity sensing element. In short, the response time is the time necessary for 95% change of RH when the humidity sensing element is subjected to a steep humidity change from 55% RH to 75% RH at 20°C.

Figure 2:
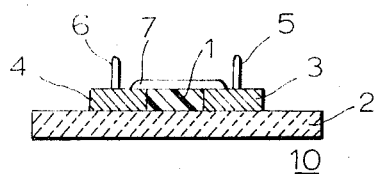
FIG. 2 is a schematic cross-sectional view of a humidity sensing element as shown in FIG. 1, which further has a protective cover coated on the humidity sensitive film thereof.

The humidity sensing element of this invention can further have a protective cover of a thin film coated on the humidity sensitive film therefore as schematically shown by reference numeral 7 in FIG. 2. The protective cover 7 protects the humidity sensitive film from environmental contaminated air or moisture, and increases the stability of the humidity sensitive film. Any available and suitable materials can be used therefor which are moisture absorptive and swelling, chemically stable and inactive with respect to the humidity sensitive film. For example, a silicone resin such as polydimethyl siloxan, and polyamino acid resin can be used therefor. The thickness of the protective cover is preferably between 0.2 micron and 2 microns in view of the moisture permeability.

This invention will be understood more readily from the following Examples 1−6, but these Examples are intended to illustrate the invention only and not to be construed to limit the scope of the invention.

EXAMPLE 1

25 weight percent of chlorinated natural rubber having 68 weight % of chlorine incorporated therein was mixed with 75 weight percent of polyamide resin (Tohmide 245: trade name of Fuji Chemical Industrial Co., Japan) produced by the condensation of dimer acid with alkylene polyamine and having in amine value of 415. The mixture was dissolved in 500 weight percent of toluene to make a solution. Carbon black having an average particle size of about 70 microns was added in various proportions to the solution and dispersed uniformly by a super sonic wave method. The weight percentages of the carbon black and the mixture of chlorinated natural rubber and polyamide resin were adjusted to be 20% to 70% and 80% to 30%, respectively, for different elements.

The homogeneous paint was adjusted to have a viscosity of 50 poises at room temperature. Each paint was applied to an alumina substrate having thereon two gold glaze paste electrodes of comb shape as shown in FIG. 3 and then heated at 130° C for 30 minutes so as to react the chlorinated natural rubber and polyamide resin and to make the humidity sensitive film. Next, each alumina substrate having the humidity sensitive film thereon was soaked in a 0.1 normal aqueous solution of sodium hydroxide for 30 minutes at room temperature in order to remove chlorine ions from humidity sensitive film. Then, alkali was sufficiently washed off with distilled water.

The humidity sensitive film of each of the thus prepared humidity sensing elements had a thickness of 3 microns and an effective width of 70 mm. The distance between the two electrodes was 0.5 mm. Two electrical leads were connected to the two electrodes on each alumina substrate. Thus, various humidity sensing elements were prepared.

Then, a humidity test was carried out. It was found that a humidity sensing element including less than 23 weight % of carbon black had very high resistance even in a low humidity environment and also that a humidity sensing element including more than 60 weight % of carbon black was brittle and had unstable resistance change. It was found that a humidity sensing element having about 23 to 60 weight % of carbon black had a stable resistance. Table 1 lists the resistances of the humidity sensing elements at various relative humidities (RH).

Table 1

| Sample No. | Weight % of carbon black | Resistance of element (20°C) | | | | |
|---|---|---|---|---|---|---|
| | | 30% RH | 50% RH | 75% RH | 95% RH | 100% RH |
| 1 | 23 | 30 KΩ | 68 KΩ | 17 MΩ | — | — |
| 2 | 33 | 2.7 KΩ | 6.2 KΩ | 150 KΩ | — | — |
| 3 | 44 | 35 Ω | 39 Ω | 60 Ω | 420 Ω | 300 KΩ |
| 4 | 60 | 28 Ω | 30 Ω | 42 Ω | 90 Ω | 25 KΩ |

(The humidities were measured by a well known method using inorganic saturation solution.) These humidity sensing elements have high sensitivity in each humidity range. For example, the element of sample No. 2 had a resistance of 30 KΩ and a sensitivity of approximately 14 KΩ1%RH at 70 % RH, and the element of Sample No. 4 had a resistance of 200Ω and a sensitivity of approximately 100Ω/%RH at 98% RH.

Further, these humidity sensing elements had rapid response i.e. response times of about 20 seconds. Still further, these humidity sensing elements had high stability with respect to a change of temperature. That is, the resistance change of these humidity sensing elements with a change of 1 °C in the relative humidity range in which the elements had high sensitivity fell within the range of resistance change corresponding to a change of RH of about 0.1–0.2 % RH.

Another kind of stability of these humidity sensing elements was examined in the following manner. 1.5 V of DC was applied between the two electrodes of each of the humidity sensing elements of Samples No. 3 and No. 4. Each of the two humidity sensing elements was placed in an atmosphere having a humidity of 100% RH at 60°C for 240 hours. Thereafter, the humidity test was carried out. The deviation of this last measured resistance of these two elements from the former measured resistance thereof fell within ±1.5% in terms of % RH at 95% RH.

EXAMPLE 2

Many samples having different reactive proportions of chlorinated natural rubber with polyamide resin were prepared in a manner substantially the same as that described in Example 1, except that in this Example 2, the weight percentage of carbon black was 33%.

The reactive proportions of chlorinated natural rubber and polyamide resin were adjusted to be 75 weight % to 5 weight % and 25 weight % to 95 weight %, respectively. It was found that a humidity sensitive element including more than 90 weight % of polyamide resin has unstable resistance in a high humidity environment and also that a humidity sensing element including less than 30 weight % of polyamide resin had a low sensitivity equivalent to well known hydrophilic resin. It was found that a humidity sensing elements having about 30 to 90 weight % of polyamide resin had high sensitivities and stable resistances. Table 2 indicates the reactive proportions of chlorinated natural rubber and polyamide resin and shows the results of humidity tests.

Table 2

| Sample No. | Reactive Proportion (wt.%) polyamide resin | Chlorinated Natural rubber | Resistance of element (20°C) 30% RH | 50% RH | 75% RH | 95% RH | 100% RH |
|---|---|---|---|---|---|---|---|
| 5 | 30 | 70 | 32 KΩ | 35 KΩ | 65 KΩ | 85 KΩ | 450 KΩ |
| 6 | 60 | 40 | 1.0 KΩ | 1.1 KΩ | 2.0 KΩ | 170 KΩ | 20 MΩ |
| 7 | 70 | 30 | 2.4 KΩ | 2.9 KΩ | 20 KΩ | — | — |
| 8 | 90 | 10 | 80 KΩ | 400 KΩ | 80 MΩ | — | — |

EXAMPLE 3

Four humidity sensing elements were prepared in substantially the same manner as in Example 1, except that in this Example 3, different polyamide resins having different amine values were used. Table 3 indicates the kinds of the humidity sensing elements and shows the results of humidity tests.

It was found that the preferable amine value of the polyamide resin was more than 100.

Table 3

| Sample No. | polyamide resin | Amine value | Reactive Proportion (wt.%) Polyamaid resin | Chlorinated Natural rubber | Resistance of element (20°C) 30% RH | 50% RH | 75% RH | 95% RH |
|---|---|---|---|---|---|---|---|---|
| 9 | Versamide 100 | 90 | 75 | 25 | 40 KΩ | 4.5 KΩ | 6.8 KΩ | 15 KΩ |
| 10 | Tohmide 215 | 225 | 75 | 25 | 3.1 KΩ | 3.7 KΩ | 6.9 KΩ | 98 KΩ |
| 11 | Tohmide 240 | 300 | 70 | 30 | 2.9 KΩ | 4.9 KΩ | 26 KΩ | 8.9 MΩ |
| 12 | Versamide 125 | 345 | 65 | 35 | 2.4 KΩ | 5.2 KΩ | 45 KΩ | — |

(Tohmide 215 and Tohmide 240 are trade names of Fuji chemical Industrial Co., Japan; and Versamide 100 and Versamide 125 are trade names of General Mills Co., U.S.A.)

EXAMPLE 4

Three humidity sensing elements were prepared in substantially the same manner as in Example 1, except that in this Example 4, different chlorine containing polymers were used, and the weight % of carbon black was 34 %. Table 4 indicates the kinds of humidity sensing elements and shows the results of humidity tests.

Table 4

| Sample No. | Chlorine Containing Polymer | Reactive Proportion (wt.%) Polyamide resin | Chlorine Containing Polymer | Resistance of element (20°C) 30% RH | 50% RH | 75%RH | 95% RH |
|---|---|---|---|---|---|---|---|
| 13 | Polyvinylidine | 75 | 25 | 1.02 KΩ | 1.15 KΩ | 2.6 KΩ | 1.5 MΩ |
|  | Polyvinyl Chloride | 75 | 25 | 0.62 KΩ | 0.70 KΩ | 0.92 KΩ | 17 KΩ |
| 15 | Chlorinated Polypropylene (chlorine content 34%) | 50 | 50 | 0.88 KΩ | 0.92 KΩ | 1.10 KΩ | 3.4 KΩ |

EXAMPLE 5

Five humidity sensing elements were prepared in substantially the same manner as in Example 1 except that in this Example 5, different finely divided conductive particles were used.

ples No. 22 and No. 23 before the high humidity and SO₂ test by only about 1.5% in terms of % RH.

Table 6

| Sample No. | | Resistance of element (20°C) | | | | |
|---|---|---|---|---|---|---|
| | | 30% RH | 50% RH | 75% RH | 95% RH | 100% RH |
| 21 | (Prepared in same manner as No. 2) | 2.2 KΩ | 5.0 KΩ | 98 KΩ | — | — |
| 22 | (Prepared in same manner as No. 18) | 1.1 KΩ | 1.18 KΩ | 2.1 KΩ | 13 KΩ | 600 KΩ |

Table 5 indicates the kinds of humidity sensing elements and shows the results of humidity tests. The humidity sensing elements having finely divided conductive particles of silver (Sample No. 19) had a discontinuous resistance change from a resistance of a few hundred ohms to a resistance of more than 50 Megohms between 75% RH and 95% RH.

Table 5

| Sample No. | Conductive Particle | Average Particle Size | Weight% of conductive Particle | Resistance of element (20°C) | | | | |
|---|---|---|---|---|---|---|---|---|
| | | | | 30% RH | 50% RH | 75% RH | 95% RH | 100% RH |
| 16 | Carbon black | 240 m-μ | 37 | 4.5 KΩ | 22 KΩ | 38 MΩ | — | — |
| 17 | Graphitized Carbon black | 30 m-μ | 37 | 1.8 KΩ | 2.5 KΩ | 6.0 KΩ | 220 KΩ | 40 MΩ |
| 18 | Graphite | 0.5 μ | 37 | 1.2 KΩ | 1.3 KΩ | 2.5 KΩ | 20 KΩ | 2.0 MΩ |
| 19 | Silver | 0.5 μ | 75 | 62 Ω | 72 Ω | 300 Ω | over 50 MΩ | — |
| 20 | Gold | 0.5 μ | 75 | 1.05 Ω | 1.10 Ω | 1.25 Ω | 2.90 Ω | 5 MΩ |

EXAMPLE 6

Two humidity sensing elements were prepared in the same manner as that used in making Sample No. 2 of Example 1 and making Sample No. 18 of Example 5. Then, polydimethyl siloxan solution was coated as in a thin film on the humidity sensitive film of each humidity sensing element as schematically shown in FIG. 2, and heated to evaporate the solvent at 90°C for 30 minutes, the resultant thin film of polydimethyl siloxan on each humidity sensitive film has a thickness of about 1 micron. Table 6 shows the results of humidity tests with respect to these two humidity sensing elements with thin films of polydimethyl siloxan thereon. These two humidity sensing elements Samples No. 21 and No. 22 had response times of about 40 seconds. The effect of the thin film of polydimethyl siloxan as a protective cover for each humidity sensitive film of humidity sensing elements was examined as follows. The curves such as those of FIG. 4 for Samples No. 2, No. 18, No. 21 and No. 22 were made. Then, Samples No. 2, No. 18, No. 21 and No. 22 were placed for 100 hours in an atmosphere having a high humidity of 95% RH (40°C) and including 100 ppm sulfurous acid gas (SO₂). Thereafter, the curves such as those of FIG. 4 for these Samples were made. The curves for Samples No. 2 and No. 18 after the high humidity and SO₂ test were shifted from the curves for the same Samples No. 2 and No. 18 before the high humidity and SO₂ test by about 7% in terms of % RH, whereas the curves for Samples No. 21 and No. 22 for the high humidity and SO₂ test were shifted from the curves for the same Sam-

What is claimed is:

1. A humidity sensing element comprising a humidity sensitive film which has finely divided conductive particles dispersed in a resin consisting essentially of a reaction product of a chlorine containing polymer and a polyamide resin, and two electrodes applied to said humidity sensitive film.

2. A humidity sensing element according to claim 1, wherein said chlorine containing polymer comprises one member selected from the group consisting of chlorinated diene polymer, chlorine containing vinyl polymer and chloro-substituted polyolefine.

3. A humidity sensing element according to claim 1, wherein said polyamide resin comprises a condensation product of an alkylene polyamine and a polycarboxylic acid which is obtained by thermal polymerization of fatty acid.

4. A humidity sensing element according to claim 1, wherein said chlorine containing polymer comprises a chlorinated natural rubber.

5. A humidity sensing element according to claim 1, wherein the reactive proportions of said chlorine containing polymer and said polyamide resin is 70 to 10 weight % of chlorine containing polymer and 30 to 90 weight % of polyamide resin.

6. A humidity sensing element according to claim 1, wherein said finely divided conductive particles consist essentially of a material selected from the group consisting of carbon black, graphite, silver and gold.

7. A humidity sensing element according to claim 1, which further has a protective cover on the humidity sensitive film thereof.

8. A humidity sensing element according to claim 7, wherein said protective cover is a thin film of moisture absorptive resin.

9. A humidity sensing element according to claim 1, wherein said polyamide resin has an amine value of more than 100.

* * * * *